United States Patent [19]
Liljenquest et al.

[11] Patent Number: 5,904,391
[45] Date of Patent: May 18, 1999

[54] TAILGATE GAP COVER

[76] Inventors: Lance Liljenquest, 12200 W. Cameo Mary, Tucson, Ariz. 85743; Lane Liljenquest, 3837 E. Holmes, Mesa, Ariz. 85206

[21] Appl. No.: 09/027,756

[22] Filed: Feb. 23, 1998

[51] Int. Cl.[6] .................................................. B62D 25/00
[52] U.S. Cl. ............................................................ 296/57.1
[58] Field of Search ...................................... 296/57.1, 50

[56] References Cited

U.S. PATENT DOCUMENTS

| | | | |
|---|---|---|---|
| D. 374,854 | 10/1996 | Little et al. | D12/400 |
| 4,763,945 | 8/1988 | Murray | 296/57 R |
| 5,188,415 | 2/1993 | Wagner | 296/57.1 |
| 5,664,822 | 9/1997 | Rosenfeld | 296/39.2 |

*Primary Examiner*—Joseph D. Pape
*Attorney, Agent, or Firm*—Antonio R. Durando

[57] ABSTRACT

A tailgate cover for a pickup truck consists of a flap running along the tailgate gap and hingedly connected to the end of the bed. When the tailgate is open, the flap has one edge flush with the end of the bed and the other edge overlapping the bottom of the gate. When the gate is closed, the flap is rotated around its hinges such that the edge overlapping the gate is pushed upward and the edge facing the bed is correspondingly flipped downward within the gap. As a result of this configuration, the flap covers the tailgate gap at all times and produces a level surface with the truck bed when the gate is lowered.

9 Claims, 3 Drawing Sheets

TAILGATE GAP COVER

BACKGROUND OF THE INVENTION

1. Field of the Invention

This invention is related in general to the field of automotive accessories and, in particular, to a device for covering the gap formed between the tailgate and the bed of a pick-up truck.

2. Description of the Related Art

Typically, pick-up trucks have a tailgate hingedly attached to the rear end of the bed, such that it can be swung open to allow loading and unloading or to extend the bed's surface. Because the bed and the tailgate are two separate structural units connected only at the hinge points, a gap is necessarily present between their abutting surfaces at the bottom of the gate. Thus, sand, gravel and other loose material that is often carried in pick-up trucks tends to fall in the gap and be lost or interfere with the operation of the tailgate and hinge mechanisms, and cause wear between the tailgate and bed end. The problem is normally exacerbated when the tailgate is open because most hinge mechanisms tend to widen the gap as the tailgate is lowered. While a gap of about 12 mm is typical when the tailgate is closed, it is not unusual for the gap to widen to about 50 mm when the tailgate is opened flat as an extension of the bed. Since loose material carried in the bed is often unloaded by pushing it over the open tailgate, the gap is filled with smaller particles during unloading, which at times makes it impossible to close the tailgate thereafter without first removing it from its hinges to free the particles.

A variety of tailgate gap covers have been described in prior-art patents. For example, U.S. Pat. No. Des. 374,854 (1996), issued to Little et al., shows a tailgate gap cover consisting of a plank with beveled edges suitable for covering the length of the gap. A retaining member is provided for installing the cover by inserting it within the gap when the tailgate is open. The device must be installed for use each time after opening the gate and does not prevent material from falling into the gap when the gate is closed.

Murray, in U.S. Pat. No. 4,763,945 (1988), describes a foldable tailgate track mat that covers the gap and provides a conforming connection as the gate is opened and closed. The mat consists of a resilient strip permanently mounted on the tailgate and slidably connected to the bed to account for the gap expansion when the gate is opened.

Finally, U.S. Pat. No. 5,664,822, issued to Rosenfield (1997), describes other resilient covers for the tailgate gap of different pickup trucks. Each cover consists of a strip attached to both the bed and the gate and features strategically-placed folding joints to accommodate the difference in gap size between open and closed conditions.

None of the devices described in the foregoing patents provides a level and smooth connection between the bed and the tailgate of a conventional truck. In addition, none is suitable for integral implementation with the hinge mechanism of the tailgate. Therefore, there still exists a need for a simple device of universal application that covers the gap between the bed and tailgate of pickup trucks and provides a uniform level surface between them.

SUMMARY OF THE INVENTION

One objective of this invention is a device for covering the gap between the bed and the tailgate of a conventional pickup truck to prevent debris and other loose material from falling off the truck and/or accumulate in the gap.

Another goal of the invention is a gap cover that is permanently mounted and is functional whether the tailgate is open or closed.

Yet another goal of the invention is a device based on a concept that can be implemented with any tailgate configuration.

A final objective is the economical manufacture of a tailgate gap cover according to the above-stated criteria by using commercially available components and materials, modified only to the extent necessary to fit the requirements of the invention.

Therefore, according to these and other objectives, the preferred embodiment of the present invention consists of a flap running along the tailgate gap and hingedly connected to the end of the bed. When the tailgate is open, the flap has one edge flush with the end of the bed and the other edge overlapping the bottom of the gate. When the gate is closed, the flap is rotated around its hinges such that the edge overlapping the gate is pushed upward and the edge facing the bed is correspondingly flipped downward within the gap. As a result of this configuration, the flap covers the tailgate gap at all times and produces a level surface with the truck bed when the gate is lowered.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DESCRIPTION OF THE PREFERRED EMBODIMENTS

The inventive concept of this invention lies in the idea of utilizing the gap between the bed and tailgate of a pickup truck to mount a hinged cover to the bed as an extension thereof bridging the two structures with a flat surface that is flush with the bed when the gate is open and is pivoted upward when the gate is closed. This disclosure provides a simple and inexpensive way to manufacture such a device.

Figure 1:
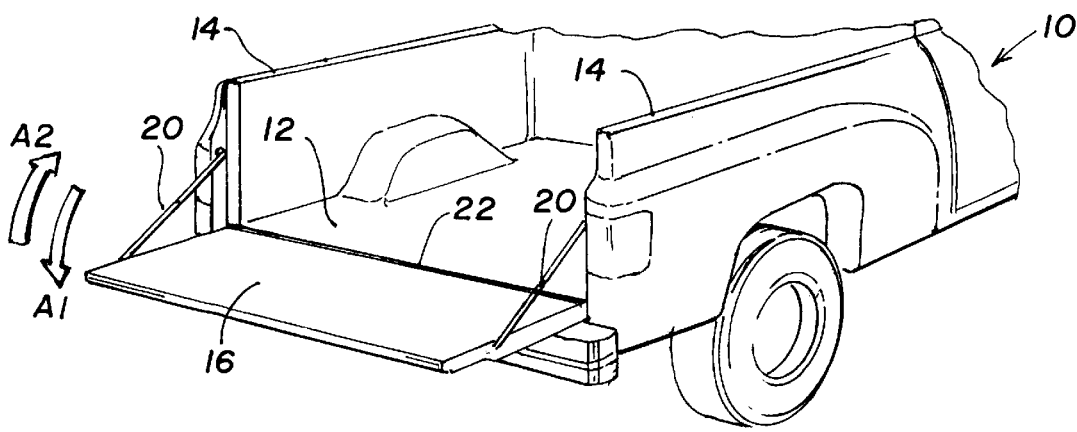
FIG. 1 is a perspective view of the bed and open tailgate of a conventional pickup truck.

Referring to the drawings, wherein like parts are designated throughout with like numerals and symbols, FIG. 1 illustrates in partial perspective view the rear section of a conventional pickup truck 10 having a bed 12 bounded by side walls 14 and by a tailgate 16, shown open. The tailgate 16 is mounted on hinges 18 (see FIG. 2) that allow it to rotate around an axis approximately coincident with the rear end of the bed 12, as illustrated by the arrows A1 and A2, between the open position of FIG. 1 and a closed position wherein the gate is held substantially vertical. Chains 20 hold the tailgate in substantially horizontal position while open. Because of this typical gate configuration, a gap 22 is necessarily present between the back end of the bed 12 and the bottom edge of the tailgate 16.

Figure 2:
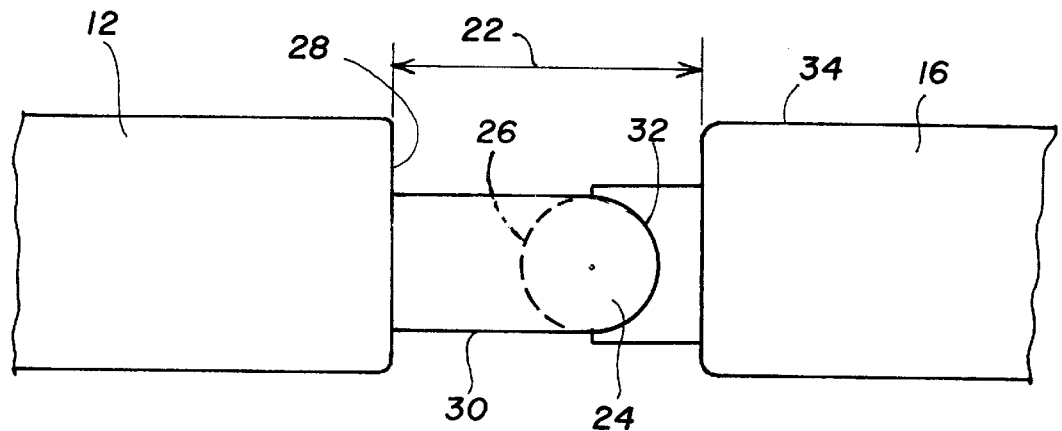
FIG. 2 is an enlarged schematic view of the gap between the bed and the open tailgate taken from the side the truck bed and illustrating a hinge over which the tailgate is rotatably mounted.

FIG. 2 is an enlarged schematic view of the gap 22 taken from the side of a truck bed 12 and illustrating a hinge 24 over which the tailgate 16 is rotatably mounted. Typically, the hinge 24 consists of a cylindrical bearing surface 26 rigidly attached to the back end 28 of the bed 16 by some retaining structure 30 and of a conforming surface 32 attached to the bottom of the tailgate and slideably connected to the surface 32 to form a journaled connection. The weight of the tailgate and the tension of the chains 20 ensure that the two surfaces remain properly engaged when the gate is rotated between closed and open positions. Normally, one such hinge 24 is present at each lateral end of the tailgate, leaving a gap 22 running the whole length of the tailgate.

Figure 3:
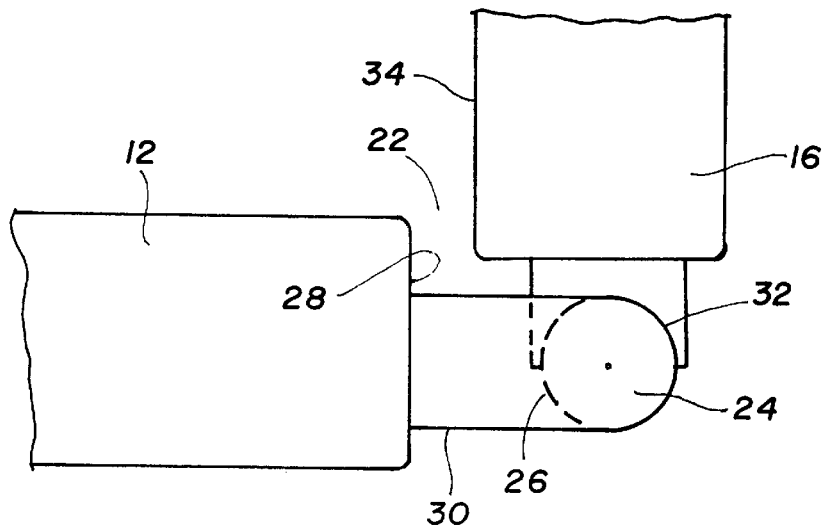
FIG. 3 is the same view of FIG. 2 with the tailgate in upright closed position.

As illustrated in FIG. 3, when the tailgate 16 is closed, its rotation to a vertical position causes the gap 22 to become considerably narrower. Optimally, the inside surface 34 of the tailgate would abut the back end 28 of the bed and eliminate the gap altogether when the gate is closed, but in practice such narrow tolerances are beyond the normal accuracy of vehicle construction. In addition, material trapped in the gap and normal wear and tear further contribute to the formation and expansion of the gap 22.

Figure 4:
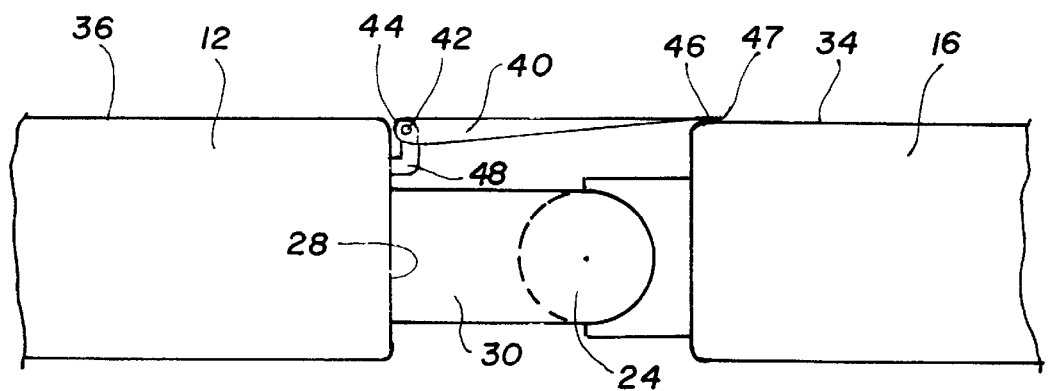
FIG. 4 is a schematic side view of the gap illustrated in FIG. 2 with the addition of the gap cover of the invention overlapping the tailgate in open position.
Figure 5:
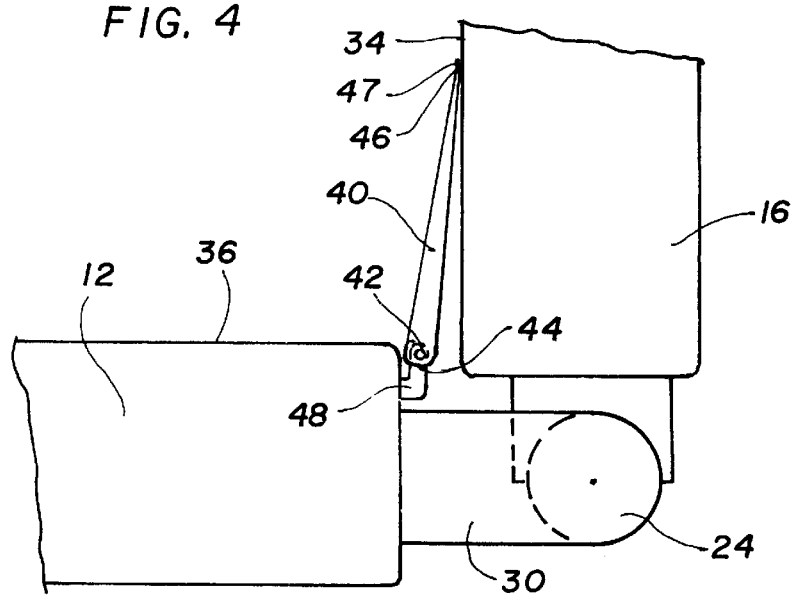
FIG. 5 illustrates the gap cover of the invention lifted upward by the tailgate in closed position.

The apparatus of the invention is illustrated in the schematic side view of FIG. 4 and consists of a flap 40 running the entire length of the gap 22 along the tailgate and adapted to cover the gap with a surface that is substantially flush with the top surface 36 of the bed and the inside surface 34 of the tailgate when the latter is open. The flap 40 is connected to the back end 28 of the bed 12 by means of at least a pair of hinges 42 that allow the rotation of the flap 40 to an upright position approximately parallel to the tailgate 16 when the gate is closed, as illustrated in FIG. 5. The front or leading edge 44 of the flap 40 is positioned against the end 28 of the bed 12 and is rounded with sufficient curvature to permit its unobstructed rotation upwards during closure of the gate 16; to that end, the radius of curvature needs to be no larger than, preferably equal to, the distance between the edge 44 and the axis of the hinge 42 about which it rotates. The width of the flap 40 is approximately the same as or slightly greater than the gap 22 when the gate 16 is open and includes a lip 46 that overlaps the tailgate 16, thereby providing a substantially level bridge between the bed and the tailgate of the truck. Upon closure of the tailgate 16, the flap 40 is swung upward by the motion of the gate pushing against the trailing edge 47 of the lip 46 and remains pivoted between the bed and tailgate to prevent material from falling in the gap 22 (as reduced by the closing of the gate).

Figure 6:
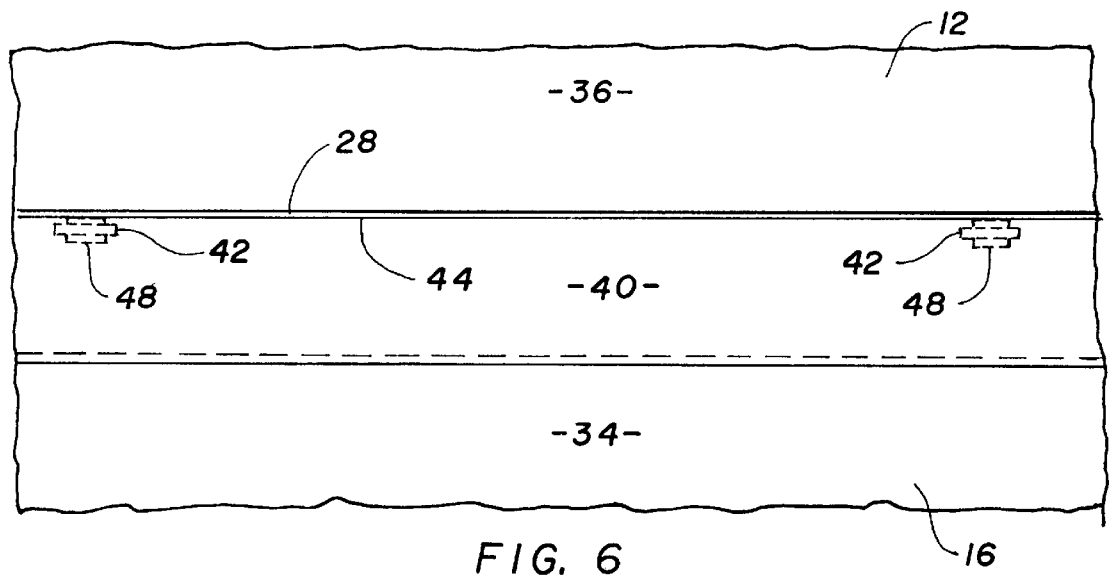
FIG. 6 is a top plan view of the flap of the invention illustrating the virtual elimination of the gap between the bed and open tailgate of a pickup truck.
Figure 7:
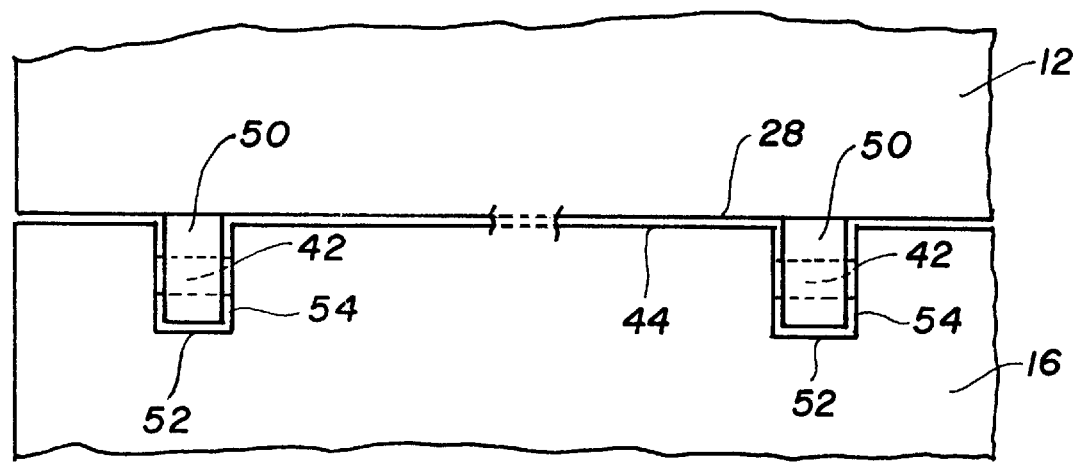
FIG. 7 is a top plan view of the flap of the invention illustrating a different embodiment of the hinges connecting the flap to the bed of the truck.
Figure 8:
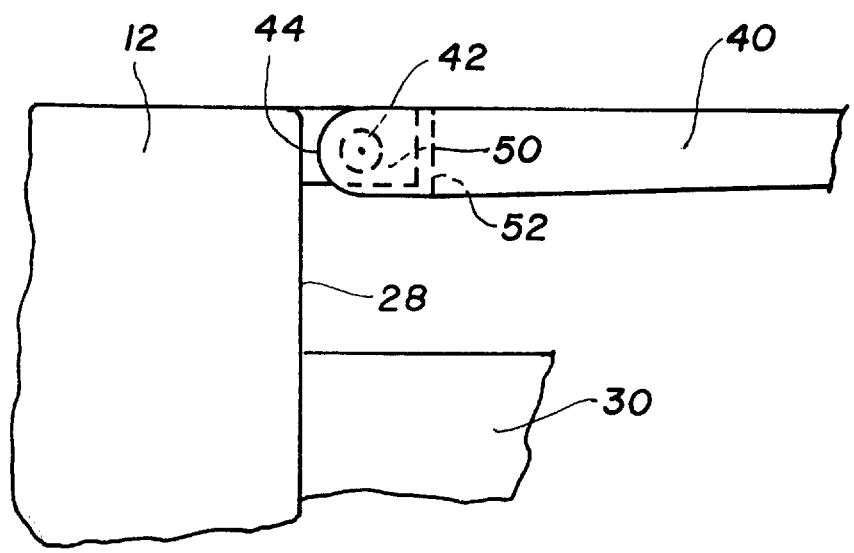
FIG. 8 is a side view of the embodiment of FIG. 7.

The hinges 42 of the flap of the invention are preferably supported by brackets 48 that extend upward from within the gap 22, so that no openings in the top surface of the flap are necessary to accommodate the flap's rotation. FIG. 6 is a top view of a portion of the flap 40 and two hinges 42 to illustrate this arrangement (also shown in FIGS. 4 and 5). Alternatively, the hinges 42 could be mounted on brackets 50 extending horizontally from the back end 28 of the bed 12 through mating insets 52 in the flap 40, as illustrated in the enlarged top and side views of FIGS. 7 and 8. Obviously, this configuration introduces additional small gaps 54 between the brackets 50 and the insets 52, but they can be easily minimized by precise machining.

Thus, the flap 40 of the invention provides a protective structure that virtually eliminates all problems created by debris and other material falling in the gap 22 between the bed and tailgate of a conventional pickup truck. The device of the invention is effective as a cover both with the tailgate open and closed, and provides a level bridge between the bed and the tailgate for unloading the truck.

Other than specifically described, the invention can obviously take other shapes with equivalent functionality and utility. For example, other methods of hinging the flap 40 to the bed 12 could be adopted instead of the cylindrical journals shown in the drawings. Similarly, the exact geometry of the underside of the flap is not important, so long as the lip 46 is free to slide upward along the surface 34 when the gate 16 is closed.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

We claim:

1. A gap cover for a truck having a bed with a back end and a tailgate movable between an open, substantially horizontal position and a closed, substantially vertical position, wherein in said open position the back end of the bed and the tailgate have substantially parallel back-end and tailgate opposing surfaces forming a gap of predetermined width therebetween, said gap cover comprising:

(a) a flap having a width substantially equal to said predetermined width of the gap, and having a leading edge immediately adjacent to said back-end opposing surface and a trailing edge overlapping said tailgate opposing surface such as to form a substantially horizontal bridge over the gap when the tailgate is in said open position; and (b) hinge means attached to said back-end opposing surface for rotating the flap to allow the trailing edge to follow a motion of the tailgate to an approximately vertical position when the tailgate is raised to said closed position.

2. The gap cover of claim 1, wherein said flap has approximately the same width as the gap.

3. The gap cover of claim 1, wherein said flap is approximately as long as the tailgate.

4. The gap cover of claim 1, wherein said flap has approximately the same width as the gap and is approximately as long as the tailgate.

5. The gap cover of claim 1, wherein said hinge means consists of multiple brackets attached to said back-end opposing surface, and each bracket supports a hinge connected to the flap.

6. The gap cover of claim 5, wherein the leading edge of the flap is curved with a radius of curvature approximately equal to a distance between the leading edge and an axis of said hinge.

7. The gap cover of claim 6, wherein said flap has approximately the same width as the gap.

8. The gap cover of claim 6, wherein said flap is approximately as long as the tailgate.

9. The gap cover of claim 6, wherein said flap has approximately the same width as the gap and is approximately as long as the tailgate.

* * * * *